Patented Nov. 7, 1933

1,933,683

UNITED STATES PATENT OFFICE 1,933,683

PRODUCTION OF BUTYL AND ISOPROPYL ALCOHOLS

Samuel C. Prescott, Brookline, Mass., and Kisaku Morikawa, Gifu, Japan; said Morikawa assignor to said Prescott No Drawing. Application January 26, 1927, Serial No. 163,831, and in Japan on or about July 8, 1926

1 Claim. (Cl. 195—20)

This invention relates to the production of certain of the higher alcohols, specifically butyl alcohol and isopropyl alcohol, and in accordance therewith these are produced by the fermentation of sugars by the action of suitable bacteria typified by a heretofore unisolated and undescribed bacillus which will hereinafter be designated Bacillus technicus.

In the practice of our invention butyl alcohol and isopropyl alcohol are jointly produced by an action of a fermenting organism, cultures of which may be readily isolated and cultivated. This organism is aerobic and the fermentation process may thus take place in the presence of air under convenient conditions. Inexpensive materials may be utilized from which a high yield of said alcohols may be obtained, which makes possible the practice of the process for commercial purposes.

The bacillus which we prefer to use and which permits the advantageous practice of our invention under the desirable conditions and with the desirable results above indicated has been discovered and isolated by us and has been named Bacillus technicus. In the practical use of the invention it will probably be found convenient to prepare cultures of the bacillus from molded rice or "koji" from which it may be readily and conveniently obtained, for instance, in the manner hereinafter described, but in order to facilitate indentification the species is described at this point.

*Morphology.*—Vegetative cells occur as single rods, pairs, and in chains. Rounded ends. Cells frequently enclose granules, especially in older stages. Size of rods 2 to 5 microns long, majority about 3 microns; 0.7 to 1.5 microns wide, majority about 1.0 microns.

*Endospores produced.*—Sporangia appear slightly swollen and with an ellipsoidal or clavated structure enclosing a spore in each cell. Sporangia 2 to 5 microns long, majority 3 microns; 1.25 to 1.5 microns wide, majority about 1.25 microns. Spores have thick walls, central location and ellipsoidal form, and measure from 1.8 to 2.5 microns in length, majority 2 microns; .6 to 1.25 microns broad, majority about 1.0 micron.

*Motility.*—In the vegetative stage motility is very active in broth or agar cultures when young. Flagella present. In old cultures some variability of form, swollen or clavated cells.

*Staining reactions.*—Young cells stain easily. Gram stain positive. Old cultures and those growing in media of high acidity show difficultly stainable cells.

Cultural characteristics

*Agar stroke.*—On nutrient agar, maltose agar or koji agar good growth, echinulate, slightly raised elevation, glistening luster, smooth or slightly contoured surface, opaque, and of butyrous consistency. On koji or malt agar the growth appears of dirty milk white or rusty brownish color due to staining by the medium. Gas is produced in the condensation water, and in the surface of the medium.

*Gelatin slab.*—Liquefies medium comparatively rapidly, showing good growth, especially at the top. If sugars are present there is accompanying gas production.

*Potato.*—Good growth of dirty white color. In older cultures tends to develop brownish color with dull luster, thick and contoured, and of butyrous consistency.

*Nutrient broth.*—Grows well, producing strong clouding and abundant compact sediment. In broths containing koji, malt or corn meal, gas is produced and butyric odor.

*Milk.*—Produces acid and gas. Casein coagulated and later weakly digested. If litmus is present, coloring matter is reduced

*Agar plate.*—Grows rapidly at 37° giving circular or somewhat irregularly margined colonies, flat in elevation, smooth or somewhat rough surface, and shows finely curled internal arrangement of threads. In koji or malt agar produces gas. Growth slower in highly acid media.

*Starch digestion.*—No action on starch agar. With corn meal mash viscosity is reduced and gas formed.

*Gas production.*—Gas is produced in arabinose, xylose, rhamnose, glucose, fructose, galactose, mannose, lactose, saccharose, maltose, raffinose, inulin, mannite, dulcite, adonite, glycerin and inosite broths. Gas is mixture of hydrogen and carbon dioxide in varying ratio depending on stage of fermentation.

*Indol production.*—Negative.
*Hydrogen sulphide.*—Negative.
*Nitrate reduction.*—Positive to nitrite and ammonia.

*Relation to oxygen.*—Good growth in aerobic or partial anaerobic conditions. Facultative anaerobe.

*Temperature relations.*—No growth below 10° C. nor at 55° C. Slow growth at 20°, but abundant between 30° and 40°. Optimum 36° to 38°.

*Relation to reaction of medium.*—Limits of growth range are approximately pH 8 to pH 4.8 in liquid media. Optimum from pH 7 to pH 6.6.

Although the morphological and cultural characteristics listed above are believed to appertain to and identify a single organism, designated *Bacillus technicus,* and the carrying out of this procedure is believed to isolate this *Bacillus technicus,* it is, of course, possible that what is supposed to be a single organism may be a symbiotic combination of two organisms or a mixture of two or more different forms or modifications of the same organism.

The word "koji" which we use herein is a transliteration of a Japanese word which signifies a ferment used in the making of sake or rice wine, for which purpose it has been produced by leaving steeped rice exposed to the air at ordinary temperatures until a fungus growth spontaneously developed which was utilized as an infusion for the hydrolysis of rice in the preparation of the said well known alcoholic beverage. It is convenient, however, to prepare the koji by a regulated molding of rice by the use of a suitable amylolitic enzyme and one suitable detailed method of so preparing it will be hereinafter described by way of example. We have been successful in isolating from a spontaneously fermented rice mash such as is used in the production of sake many characteristic organisms showing good growth on acidic media, among these being the *Bacillus technicus* referred to which is of special importance. This organism has been found to be different from other organisms previously described, especially in the fact that it is aerobic in its preferred relation to air and yields normal butyl and isopropyl alcohols as its characteristic products. While koji is probably the most convenient source thereof, we have since been successful in identifying it and isolating it from other sources, for instance, from damaged corn stalks which had lain untouched for a long period in a farm-yard.

To isolate the organism the bacterial flora of the koji are cultivated in koji broth until endospores appear. The broth is then heated to a temperature of 80° C. for a period of five minutes which will kill most of the accompanying organisms. The process of isolation is then continued in the manner well known to bacteriologists, the different types of organisms being isolated upon solid culture media and grown in pure cultures of sterilized koji broth, tests being made of their power of producing the characteristic action of the organism in the fermentation of sugars with the production of the higher alcohols, the presence of the organism being readily noted through the odor of butyl alcohol incident to such fermentation.

As an example of a regulable method of producing koji we may instance the following. Grains of rice suitably cleansed are soaked in a mild, hard water for about a day and a half, the water being changed several times and the temperature being maintained substantially constant. The amount of water absorbed by the rice in soaking is about 15% to 17% by weight and there is an increased volume of the soaked rice of about 40% to 50%. The soaked rice is drained and cooked in a moderate current of steam for about one hour or until the starch has reached a well dextrinized state and is then spread on mats, cooled and shaken to prevent the grains from uniting in lumps. The rice is then sown with spores of an organism having strong amylolytic enzyme production, conveniently those of *Aspergillus orizæ* which may be prepared preferably from nonpolished hulled rice or slightly polished rice to which, moreover, ashes from wood or straw may be added in the proportion of 1000 parts of rice to 5 parts of ash by volume. This rice is carefully cultured with spores of *Aspergillus orizæ* and in a few days a perfectly sporulated mass may be obtained which may be dried and stored in a cool and dry condition. As there are many varieties of the type of organism referred to it is desirable to select a variety with a strong saccharifying power and less spore production and usually those spores which have a good flavor and bright color will be found to produce good results.

The steamed rice which is to be sown with these spores is cooled to about 30° to 35° C. and kept for a few hours in a malt house covered with mats in order to obtain substantially uniform moisture and temperature conditions through the mass. It is then sprinkled with spores in the proportion of 1 part of spore to 1000 parts of original rice by weight, and the spores are distributed throughout the rice by shaking. The rice is again heaped, covered with mats and left in this state for about 13 to 18 hours, after which the germinated spores will show white spots on the surface of the rice which is then again spread out and shaken. After 4 to 6 hours the white spots will be found to have increased, covering nearly all the grain. At the end of this time it is shaken again and placed in trays, about two-thirds of a liter of the partially molded rice being placed in each tray (measuring about 1.4x1.0x0.2 feet) and heaped at the center. These trays are then piled one on another in tiers of six or more in a malt house. In 3 or 4 hours after this operation the growth of molds may raise the temperature considerably and the trays should be shaken to spread the rice in a thin layer and the position of the trays relative one to another may be changed. The growth may be nearly completed in about 8 or 9 hours and may raise the temperature to about 40° C. The trays are again shaken and two or three furrows made in the mass so as to bring the rice in contact with the air and it is allowed to stand for 5 or 6 hours in this condition. Afterwards it is necessary only to change about the trays. The mycelium winds about among the grains as it grows and forms a kind of cake. The temperature should then be lowered to prevent spore formation and the products finally taken from the malt house and cooled to room temperature. The temperature during the process may run below 40° to 42° C. and the time required should be about 45 to 55 hours. The koji thus prepared is ready for further use.

We refer to the preceding paragraph beginning "To isolate the organism the bacterial flora, etc." for a description of the method of isolating the organism.

Cultures of the bacillus described may be utilized under suitable conditions for fermenting sugar-bearing mashes with the joint production of butyl alcohol and isopropyl alcohol, for instance, a mash, comprising rice hydrolized by koji and sterilized by heat to kill organisms therein which might adversely affect the culture, may be utilized. However, the bacillus apparently will cause fermentation of practically any fermentable sugar, such, for instance, as corn sugar, cane sugar, maltose, molasses, pentoses or wood sugars. However, such sugar solutions as glucose, cane sugar, lactose and maltose, when treated alone with the bacillus, ferment less readily and give smaller yields than, for instance, the mash of rice hydrolized by koji. The fermentations may be facilitated and the yield improved by mixing with such solutions suitable vegetable proteins providing a food substance for the bacteria and such proteins may conveniently and preferably be of the nature of those occurring in koji, that is, rice which has been subjected to the action of molds yielding amylase and other digestive enzymes, and we recommend the use of such a molded rice constituent in the mash to be fermented. This constituent may be utilized as a source of enzyme to cause hydrolysis of the starch-bearing material with which it is used in order to form fermentable sugars. The mixed mash should be sterilized by heat before the addition of the *Bacillus technicus* culture to kill any organisms which might adversely affect the former.

While the process of fermentation invented by us is, of course, susceptible of wide variations in practice, in order to illustrate the matter and by way of example merely and without limitation to the proportion or conditions set forth, we will describe in detail a particular method of procedure by which the desired alcohols may be obtained from a corn and rice mash in accordance with our invention.

A substratum consisting of molded rice and corn (maize) may be prepared as follows. About 300 grams dry weight of corn is steamed or boiled in about 1500 cc. of water, then cooled down to 40° to 50° C., mixed with about 300 grams of molded rice or koji prepared as above described, and allowed to stand overnight at a temperature of about 60° C. The pasty material will reduce in viscosity, producing sugars, and will become a somewhat watery liquor. During the digestion occasional agitation may be necessary for best results. After the digestion is finished, the mash may be diluted with about 4000 cc. of water and sterilized. Promptly after sterilization it should be cooled with cold water to prevent further decomposition and it is then treated with calcium carbonate to neutralize it.

For inoculating the mash a small amount of pure culture of *Bacillus technicus* is scraped with a platinum wire loop from the surface of an agar culture and added to a test tube containing 10 cc. of sterilized koji broth, that is, a solution of koji or molded rice completely digested or enriched by the addition of meat extract or peptone solution. After incubation at 36° C. for about 24 hours, this is added to 100 cc. of sterilized koji broth and this again is incubated at 36° C. for about 24 hours. The culture thus prepared is added to this mixture and fermented at about 37° C. for about 3 days when the mash may be subjected to distillization to obtain the desired alcohols.

In the application of our invention we recommend that the fermentable mash or substratum should contain fermentable carbohydrates to the extent of about 10% or 12% figured on total weight of the mash. The proportions obviously may vary but, speaking generally, the mash should not contain less than 5% carbohydrate or it will be found to ferment slowly for commercial purposes while mashes containing over 14% would tend to have an adverse effect on the bacillus. When working with starch mashes, such as corn, potato, sweet potato and other vegetable products, in connection with molded rice as above described, the latter ingredient, which supplies the enzyme for the conversion of the starch and also provides a suitable food for the nourishment of the fermenting bacteria, may desirably constitute from one-fifth to one-half of the total solids in the mash. The proportion of the molded rice or koji constituent may be governed in part by the kind of koji, young or mature, or the strain of the molds therein which have variable digestive power. In the case of sugar mashes such as corn sugar, cane sugar, maltose, molasses, pentoses or wood sugars, or other sugars, solutions of 10% or 12% figured on the total weight of the mash, can advantageously be used which include a small quantity, say about 5% figured on the amount of sugar, of molded rice to supply suitable food for the fermenting bacteria. The temperature of the fermentation should in general be between 34° to 42° C. and we recommend as preferable about 37°. The time of fermentation is preferably about two to three days, depending upon the other conditions.

After fermentation the alcohols may be distilled off in any convenient manner known to the art and may be separated by a fractionation.

We have described in detail the characteristics of the fermenting bacillus which we have successfully used and by way of example have given in exact form one method of procedure by which our invention may be practised. Obviously, however, the detailed nature of the description has had clearness for its object and is not to be understood as definitive of or as a limitation on the scope of the invention. What we claim as new and desire to secure by Letters Patent we shall express in the following claim.

The process of producing mainly butyl and isopropyl alcohols with substantial exclusion of ethyl alcohol characterized by the step of fermenting a mash bearing fermentable sugars with a substantially pure culture of the herein described *Bacillus technicus*.

SAMUEL C. PRESCOTT.
KISAKU MORIKAWA.